United States Patent [19]

Leenhouts

[11] 4,163,184
[45] Jul. 31, 1979

[54] ARCUATE MOVEMENT NUMERICAL CONTROL METHOD AND SYSTEM

[75] Inventor: Albert C. Leenhouts, Harwinton, Conn.

[73] Assignee: The Superior Electric Company, Bristol, Conn.

[21] Appl. No.: 512,295

[22] Filed: Oct. 4, 1974

[51] Int. Cl.² .............................................. G05B 19/24
[52] U.S. Cl. ...................................... 318/573; 318/574
[58] Field of Search ................ 318/573, 574, 138, 578

[56] References Cited

U.S. PATENT DOCUMENTS

| | | | |
|---|---|---|---|
| 2,833,941 | 5/1958 | Rosenberg et al. | 318/574 X |
| 3,416,056 | 12/1968 | Motooka et al. | 318/573 |
| 3,461,365 | 8/1969 | Newland et al. | 318/573 |
| 3,525,917 | 8/1970 | Leenhouts | 318/138 X |
| 3,559,021 | 1/1971 | Bingham, Jr. | 318/578 X |
| 3,585,478 | 6/1971 | Leenhouts | 318/573 |
| 3,609,319 | 9/1971 | Clifford et al. | 318/573 X |
| 3,634,667 | 1/1972 | Okamoto et al. | 318/573 X |
| 3,749,995 | 7/1973 | Leenhouts | 318/574 X |
| 3,770,947 | 11/1973 | Deily | 318/573 X |
| 3,864,613 | 2/1975 | Cutler | 318/573 |

OTHER PUBLICATIONS

D. Wortzman, "Circular Interpolation for Computer Control of Machine Tools", IBM Tech. Bull., vol. 12, No. 1, Jun. 1969, pp. 156-158.

*Primary Examiner*—J. V. Truhe
*Assistant Examiner*—Eugene S. Indyk
*Attorney, Agent, or Firm*—Ernest M. Junkins

[57] ABSTRACT

A method and apparatus for producing relative arcuate movement which may be greater than one quadrant for each input command by subdividing the movement into a plurality of sequential linear lengths of varying extent and proper direction. The extent of each length is defined by the number of steps of movement to be produced simultaneously over the same time interval on each of the pair of perpendicular axes. The extent of each length is determined to be that which both maintains the actual movement within a maximum deviation from the commanded path and is within the change of velocity limitation of the system thereby inherently providing acceleration and deceleration as well as not excessively exceeding any feed rate command.

The method and system further selects the extent of the length from a group of possible extents by investigating which extent is most acceptable having regard to relative emphasis of path deviation and velocity error. The relative emphasis may be set by input commands.

29 Claims, 10 Drawing Figures

ARCUATE MOVEMENT NUMERICAL CONTROL METHOD AND SYSTEM

In my copending U.S. application Ser. No. 474,672, filed May 30, 1974 and assigned to the assignee of the present invention, there is disclosed a numerical control system and method for producing a linear movement essentially along a commanded path by producing equal distance increments or steps on coordinate axes by using digitally operating motors. The movement is subdivided into a plurality of sequential lengths each of which is defined by the number of steps that must be taken on each of two axes simultaneously in a selected time interval. The extent of each length is set by parameters of the system including the ability of the motors to not only produce the steps required during the time interval but also their ability to change velocity. This is equatable to the difference in the number of steps on each axis between adjacent lengths when the time intervals are constant and the difference in steps is maintained within an absolute numerical value, preferably one step.

In addition to velocity considerations, the heretofore mentioned linear system also controls the extent of each length to prevent any length from causing an actual movement that would exceed a set maximum deviation from the commanded path. By the method and system of using lengths normally having a plurality of steps on each axis, the numerical control system is thus rendered extremely susceptible to having the determination of the extent of each length produced by a properly programmed small computer since it only requires a small fraction of on-time usage of the computer during a time interval thereby permitting the computer to perform other calculations for the remainder of the interval.

While the above-noted system has been found to be very satisfactory, it is incapable of following commands requiring non-linear movement. One system for producing arcuate or contouring movement is disclosed in my U.S. Pat. No. 3,585,478, granted June 15, 1971, assigned to the assignee of the present invention, and entitled "Method and Apparatus for Digital Contouring Using Stepping Motors With Close Approximation of the Desired Path". This system, while capable of producing essentially arcuate movement, requires that the steps be taken sequentially with a determination being made for each step of the axis on which the step is to occur. As the determinations are time-consuming and required for each step, there is thus set a limitation on the speed of operation of the system. Moreover, if such a method were employed in a system using a computer to produce the determinations, essentially full time dedication of the computer to the determinations during a movement would be required.

It is accordingly an object of the present invention to provide a method for and a numerical control system that is capable of producing arcuate movement that essentially corresponds to a commanded path movement with the movement being composed of sequential lengths.

Another object of the present invention is to achieve the above object by a method and system that is capable of producing an arcuate movement that extends over more than one quadrant from only a single input command.

A further object of the present invention is to provide a method and system for producing relative movement on two coordinate axes that sub-divides the movement into lengths of different extent in which the extent of each length is controlled by deviation and velocity limitations and in which the relative effect of these limitations may be varied to thereby enable emphasis of either one for selecting the extent of a length.

Still another object of the present invention is to achieve the above objects with a numerical control system that may include a general purpose computer programmed according to the herein disclosed method and which substantially minimizes the demand for on-time usage of the computer during a movement.

Another object of the present invention is to provide a numerical control system and method for producing arcuate movement which while achieving the above objects is extremely compatible with a heretofore known linear numerical control system and method.

In carrying out the present invention, the structure of the numerical control system disclosed in my above-noted application is employed and includes a small general purpose computer, though if desired a system having hardwired components may be used in place thereof. However, the computer included system is preferred as not only may the computer be programmed to produce arcuate movement according to the present invention but it also remains capable of containing a linear program required to produce linear movement. Thus, by merely programming the computer to further follow the present method and without additional components, the linear numerical control system thus becomes capable of performing either linear movements or arcuate movements depending upon the input commands without any other structural alteration of the system, though, of course, the computer has to have sufficient capacity to perform the required determinations.

The present invention also subdivides the commanded movement into lengths which are defined by the number of steps that are to occur on each axis simultaneously in a time interval and hence the same motors and motor controls in the system disclosed in the application may be employed. The motor control receives not only the number of steps as a binary number for each axis for a length but also an indication of the direction in which the steps are to occur on each axis. This length information is then converted into a group of pulses for each axis that are evenly spread over the time interval with each pulse being essentially simultaneously converted into an incremental step or movement by its respective motor.

The extent of each length is made to be related to its immediately prior length by having the number of steps on each axis vary from the extent of the prior length by no more than an absolute value of 1, though, of course, another absolute value such as 2 may be used if desired. The number of probable extents of a length is thus no more than nine for an absolute value of 1, or 25 for a value of 2. Of these probable extents, some or perhaps all but one may be excluded as not being capable of being a length because of limiting change in velocity factors so that only unexcluded possible extents remain from which the length is to be selected. The selection involves determining for each possible (unexcluded) extent its effect on path deviation and velocity error, the former being the perpendicular distance between the actual path and the commanded path and the latter, the difference between the commanded velocity and the actual length velocity.

Though there may be more than one possible extent which comes within permissible limits as to deviation and error the present method further determines which of the possible extents is the most acceptable. The latter consideration involves placing relative emphasis on deviation and error by multiplying each value by a weight figure with the ratio of the weight figures setting the emphasis. Accordingly, one possible extent is initially selected herein specifically, the minimum extent, and the weighted sum of its weighted deviation and weighted error are determined. The other possible extents also have their weighted sum determined and the weighted sums are compared with the possible extent having the least value of weighted sum being selected as the most acceptable length.

In addition to the extent, the present method produces an indication of the direction of movement on each axis for each length. This is achieved by calculating for each length the direction and distance from the beginning of the length to the center of the arc expressed as $\pm i$ along the X axis and $\pm j$ along the Y axis. By utilizing these algebraic signs, indicating direction, together with the commanded direction of rotation the direction of the length is set. Moreover, the direction of each length on an axis is compared with the prior length axis direction to determine if a change in direction is to occur and if so, said change is utilized to have the extent on such an axis of at least one length be zero. This assures even with a stepping motor that the axis extents will be such as to enable the motor to properly reverse itself especially when the next two lengths are made to have an extent on such an axis of only one step.

Other features and advantages will hereinafter appear.

Figure 1:
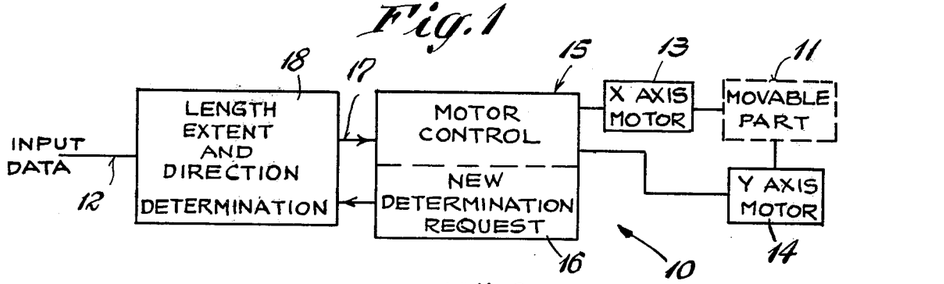
FIG. 1 is a block diagram of the numerical control system in the present invention.

Referring to the drawing, the numerical control system of the present invention is generally indicated by the reference numeral 10 and is used to provide relative movement of a machine or other part 11 in accordance with input commands received on a lead 12. The part 11 is shown diagrammatically connected to an X axis motor 13 and a Y axis motor 14. Each motor is mechanically connected to the part 11 to produce a linear movement of the part upon rotation of the motor, as by a lead screw (not shown) with the linear movements produced by the motors being perpendicular to each other, along coordinate axes.

Each of the motors has its energization controlled by a motor control 15 having a portion 16 labeled new determination request. The control 15 accepts input information of the direction and extent of each length on a lead 17 and it consists of electrical representations of the number of steps or incremental movements that each axis is to produce simultaneously in the same time interval. The control 15 then produces for each axis, a number of pulses which equals the corresponding axis number received on the lead 17 and spaces these pulses evenly on each axis over the duration of the time interval. It further changes the energization of the motors so that for each pulse produced, an incremental step is essentially simultaneously effected by its associated motor. The motors are thus pulse to step devices with two well known types being a stepping motor and a digital D.C. servo drive motor.

The lead 17 receives information from a block 18 labeled "length extent and direction determination" which determines the extent and direction of each length required to produce an actual movement that is in accordance with input commands received on the lead 12. This block represents either a hardwired circuit specifically constructed and designed to follow the hereinafter disclosed method for determining the lengths or may be a computer having a program that specifically adapts the computer to carry out the method. One kind of computer that may be used in a Texas Instrument 980 minicomputer.

For a more complete description of the above-noted elements reference is made to my above-noted copending application Ser. No. 474,672, filed May 30, 1974.

In following the herein disclosed method for producing arcuate movement, an input command for such a movement includes information of $\pm \Delta X$ and $\pm \Delta Y$ which are the number of steps that the end of a commanded arc is from its beginning with the sign of each indicating the direction therefrom, and $\pm i$ and $\pm j$, the distance in steps and direction along the X and Y axes, respectively, that the center of the commanded arc is located from the beginning of the arc. The direction of movement to produce the arc, either clockwise or counterclockwise, is preferably represented in EIA accepted format by the letter G followed by the numeral 02 for arcuate movement in a clockwise direction and the numeral 03 for arcuate movement in counterclockwise direction. Each of the above representations is included in each input command requiring an arcuate movement. It is also noted that if a computer is used and programmed for both linear and arcuate movements, that the letter G followed by 01 may be used to have the computer use the linear program.

An additional input command which may be either fixed for a plurality of arcuate movements or, if desired, supplied for each individual movement is the letter K followed by a number to represent the desired maximum velocity change in the system with the number being numerically equal to the square root of the ability of the system to accelerate and decelerate and herein is the number of time intervals per second. Another input command is a feed rate command which is conventionally expressed as the letter F followed by the number of tenths of inches per minute that the part 12 is to be essentially maximumly moved along the path.

The system, as herein disclosed enables the extent of a length to be normally chosen from a plurality of different possible extents and further effects balancing of the emphasis on the selection of the extent between velocity error and path deviation. To effect the relative emphasizing, numerical weight factors are given to each, with one possible numerical ratio of weight factors being 16 for velocity error and 42 for path deviation. As the system relies for selection upon the smallest sum of the weighted error and weighted deviation, the path deviation for the above ratio is thus about 2½ times more important in the length selection than the velocity error. Herein, the path deviation weight is represented by the symbol W and may be an input command with the velocity error weight being preferably fixed at a value of 16 for all movements. The higher the numerical value of W in an input command, the more the path deviation is thus emphasized over velocity error.

Figure 4:
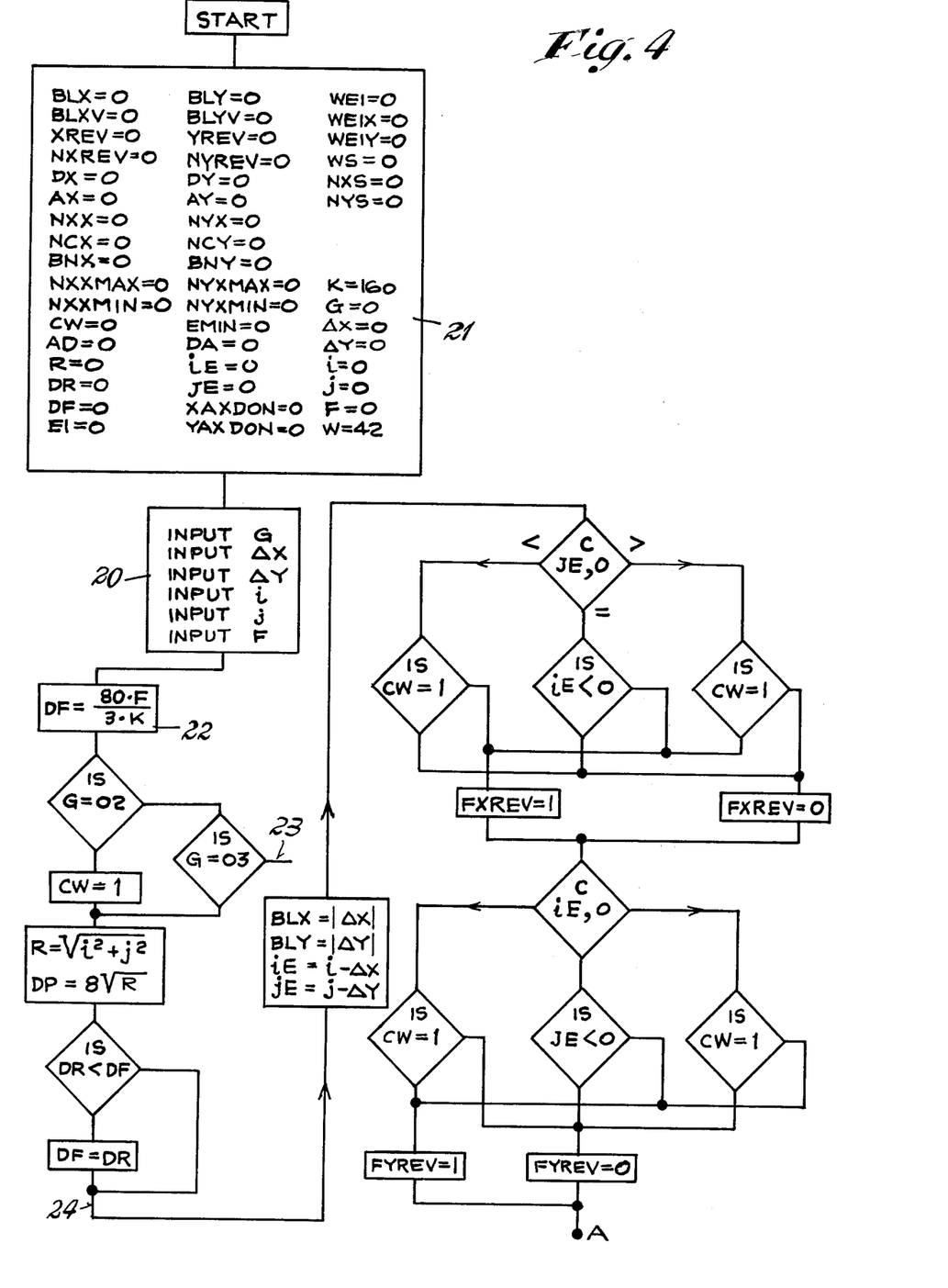
FIGS. 4–4F constitute a continuous flow chart of the steps of the method of the present invention and which may be used to either program a computer or to hardwire a circuit for performing the method or a combination of both.
Figure 4A:
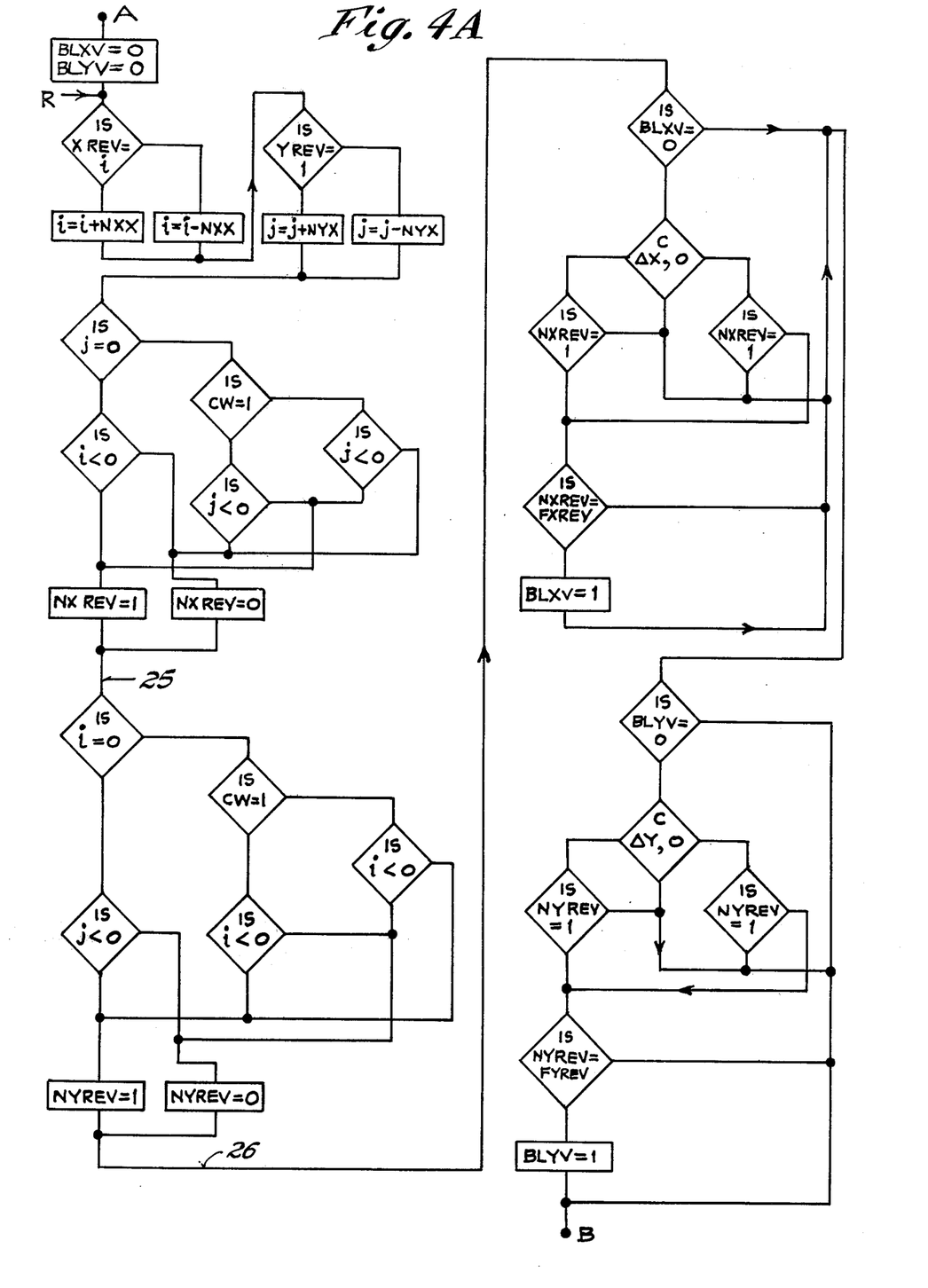
Figure 4B:
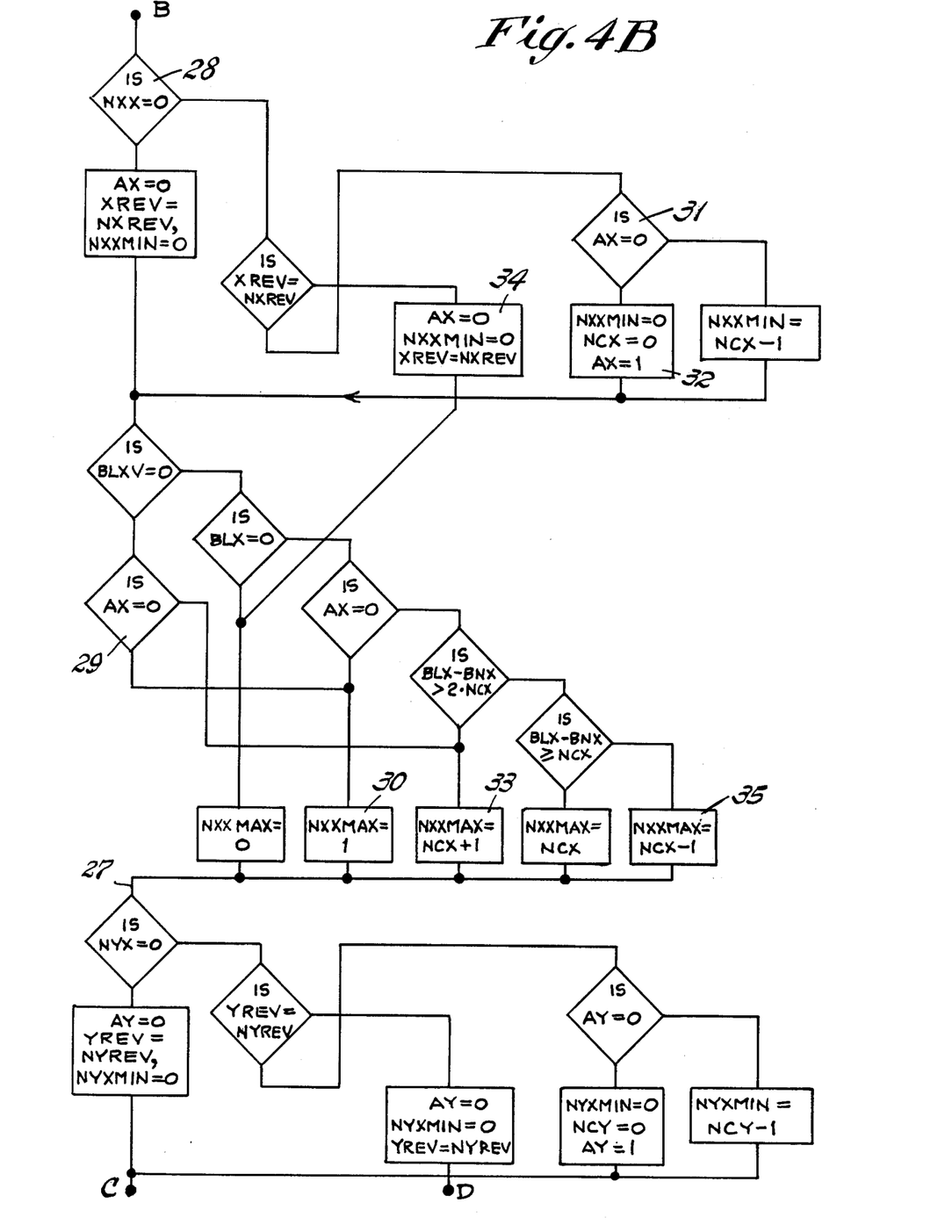
Figure 4C:
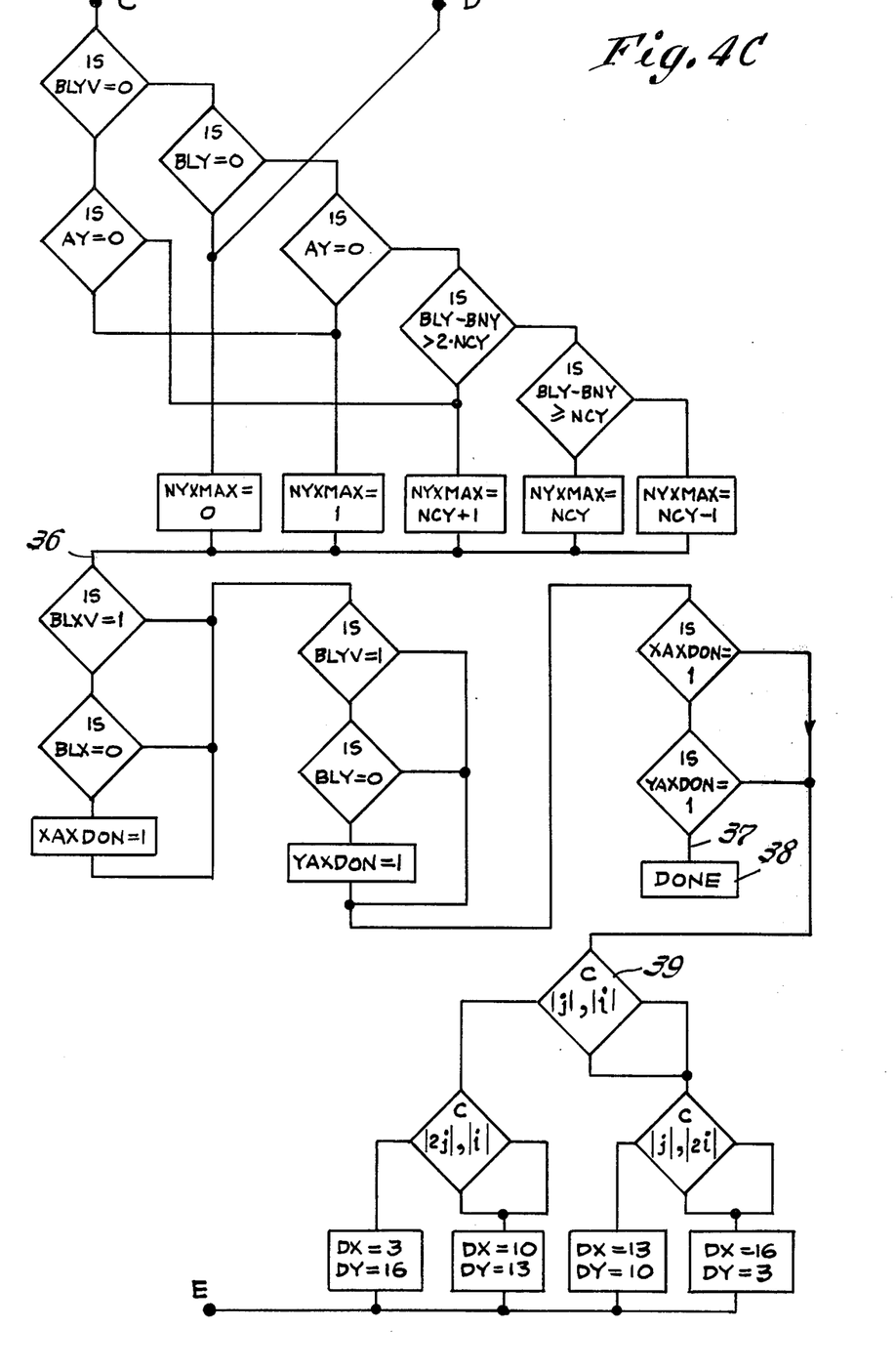
Figure 4D:
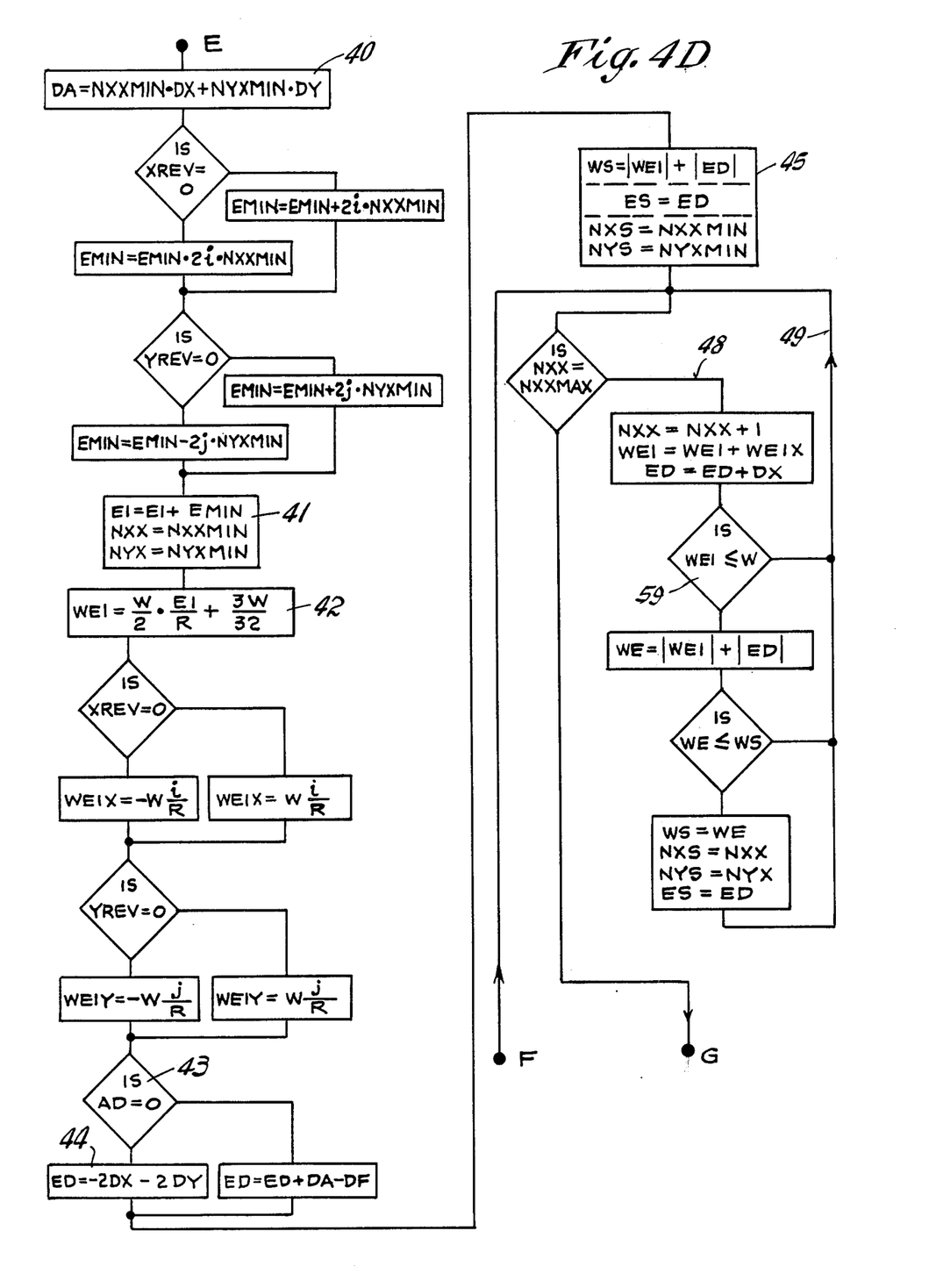
Figure 4E:
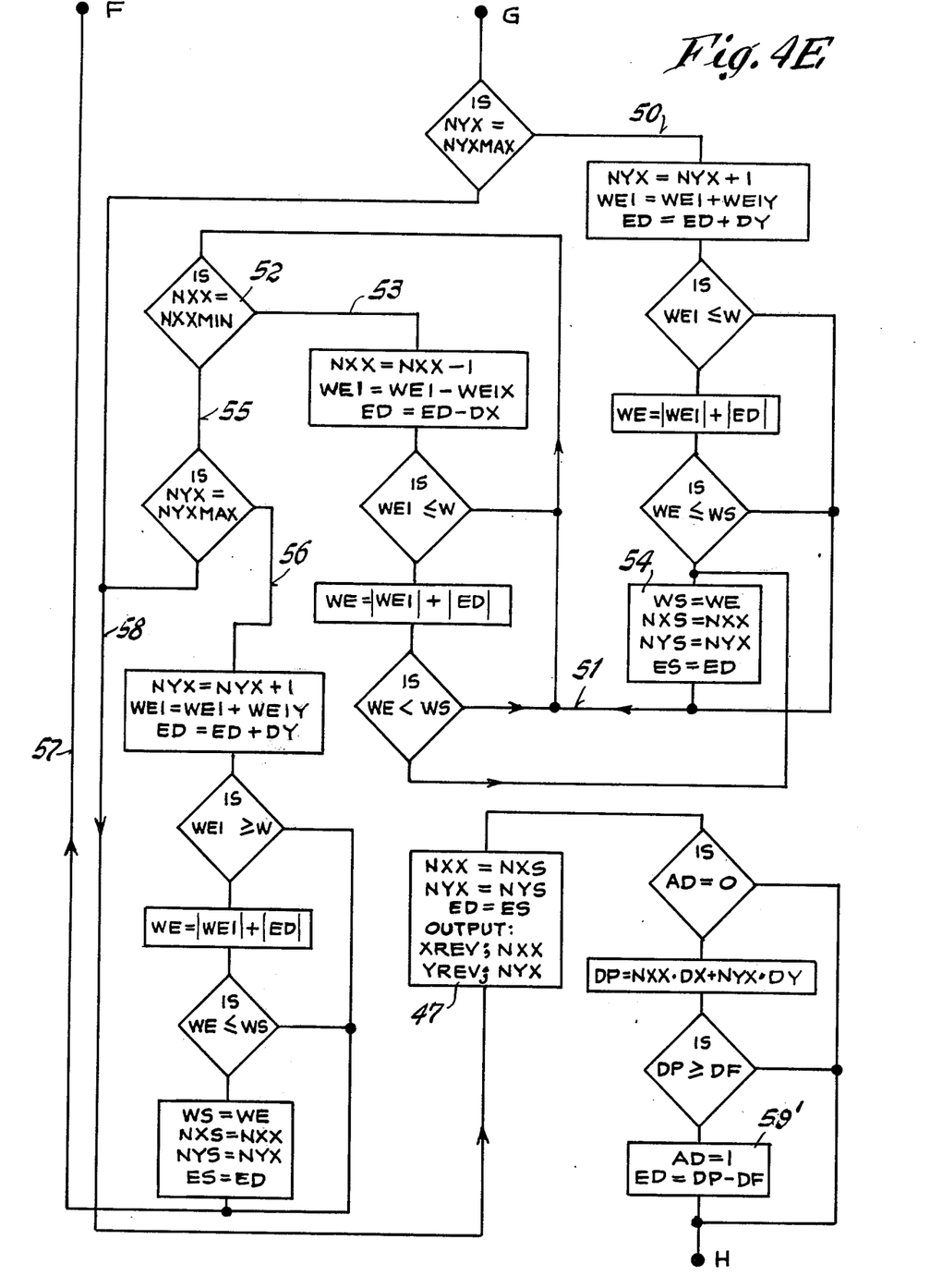
Figure 4F:
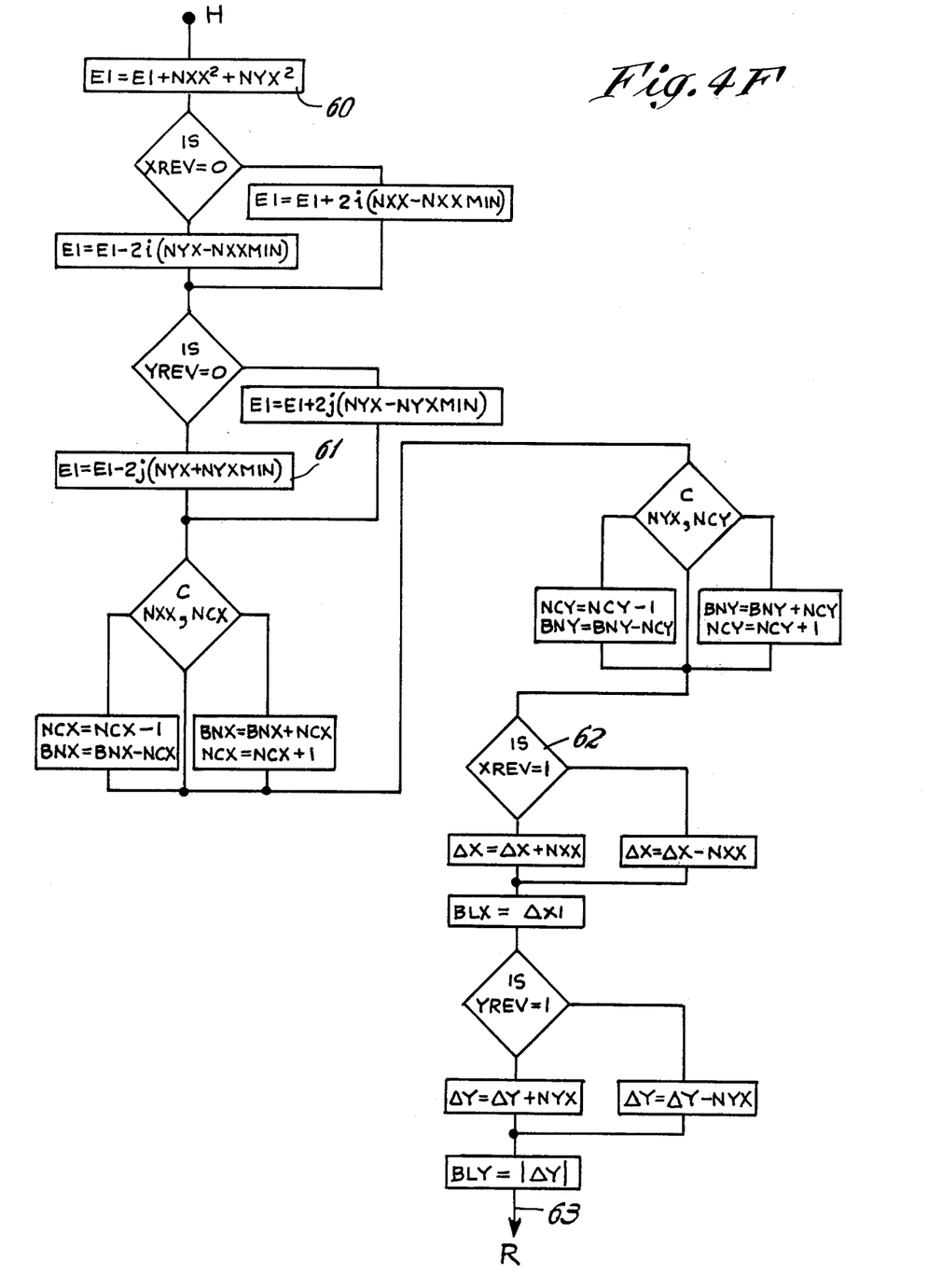

Referring to FIGS. 4–4F which discloses the steps in the method for determining the sequential lengths, FIG. 4 shows all the above values (except for values for K and W) being in an input command for each movement by inclusion in a block 20. As to K and W values, they have been previously fixed at values of 160 and 42, respectively, for this movement by their inclusion in an initializing block 21 and hence may be the same for many commanded movements.

The determination method described by the flow chart uses a plurality of representations or symbols in addition to those set forth above. It will be understood that input values and directions of $\Delta X$, $\Delta Y$, i and j are stored in registers and that their values change as the lengths are determined and the part so moved.

Some of the other symbols used are identical to that utilized in the determination method disclosed in the above-noted application on a linear numerical control system. These include BLX (BLY) for the X (Y) axis which represents a register containing the absolute value of the number of steps remaining to be made on the axis; BNX (BNY) which represents a register containing the number of steps required for deceleration on the X (Y) axis; NCX (NCY) which represents a register containing the number of steps on the X (Y) axis in an immediately previous length except when the length is zero steps; NXX (NYX) which represents a register containing the numerical value in steps along the X (Y) axis of the length that is presently determined and which is supplied to the motor control 15; NXXMIN (NYXMIN) which represents a register containing the number of steps on the X (Y) axis that is one less than the value of NCX (NCY) except when the previous length has a value of zero along the X (Y) axis; and NXXMAX (NYCMAX) which represents a register containing the number of steps on the X (Y) axis that is no more than one greater than the value of NCX (NCY).

Other symbols and representations used in the flow chart include AX (AY) which represents a bistable device which may have a 1 or 0 state and is used to control the extent of the next two lengths along the X (Y) axis after a zero extent length in order to assure that the X (Y) axis motor will have sufficient time to accelerate; BLXV (BLYV) which represents a bistable device for the X (Y) axis that stores the information that the distance stored in BLX (BLY) register is in the same direction as the final direction and that no further reversals of direction are required in completing the movement on the X (Y) axis; DX (DY) which represents a register that stores as a number, a value that equals sixteen times the distance in theoretical steps along the actual path that an X (Y) step produces with the distance being somewhat approximated; IPX (IPY) which represents a register containing a number which if it is a linear move would be equal to the absolute original value of $\Delta X$ ($\Delta Y$) but as the present determination is arcuate it is set to the absolute value of J (or i) and used as an interpolation parameter to obtain the path direction perpendicular to the radius of the movement; NXREV (NYREV) which represents a bistable device that if having a 1 state indicates movement is in the minus direction along the X (Y) axis; NXS (NYS) which represents a register which contains the instantaneous value of the steps of a length being determined on the X (Y) axis that has been found most acceptable of the probable extents that have so far been considered; WEIX (WEIY) which represents a register that contains W times the deviation produced by an X (Y) step; XAXDON (YAXDON) which represents a bistable device which if in a 1 state indicates that the commanded movement on the X (Y) axis has been produced and thus the X (Y) axis movement is complete; XREV (YREV) which represents a bistable device which indicates the direction of movement of the X (Y) axis motor and constitutes an output of the determination and in the herein disclosed embodiment the state of 0 commands an X axis move right and a Y axis move up while a state of 1 commands an X axis move left and a Y axis move down.

Further representations or symbols appearing in the flow chart are AD which represents a bistable device which assumes the state of 1 when the extent of a length first reaches or exceeds the commanded feed rate as defined by DF and retains this state for the remainder of the movement; CW which represents a bistable device which is set to the state of 1 for a commanded clockwise movement and a state of 0 for a counterclockwise movement; DA which represents a register which stores a number that is approximately equal to 16 times the number of theoretical steps on the path of the minimum extent of the length being determined; DF which represents a register which stores a number that is 16 times the number of theoretical steps on the path which the commanded feed rate would produce in a time interval; DR which represents a register which stores a number that is 16 times one-half the square root of the radius of the arc of the commanded movement and serves to reduce the commanded feed rate for small radii arcs; ED which represents a register which stores the sign and the value of the weighted accumulated velocity error; EI which represents a register which stores the sign and the value of the weighted accumulated deviation error as it is actually computed for each determined length; EMIN which represents a register which stores the weighted path deviation produced by a length having a minimum extent and iE (jE) which represents a register which stores the direction and value of i (j) less the initial value of $\Delta X$ ($\Delta Y$) and is used to determine the final direction on the X (Y) axis at the end of the commanded movement.

Additional symbols used are R which represents a register which stores the value in theoretical steps of the radius of the commanded arc; WEI which represents a register which maintains the value of the total weighted path deviation both as to sign and value; WS which represents a register which stores the sum of the value of the weighted path deviation and velocity error obtained during the investigation of the possible extents of a length by retaining the lowest sum produced by the possible extents so far considered for a length; ES which represents a register that stores the value of ED for the extent of the length that has so far in the investigation been found most acceptable and FXREV (FYREV) which represents a bistable device that stores the final direction of the X (Y) movement in the path.

Referring to the method of determining the extent of the lengths as exemplified by the flow chart, FIGS. 4 through 4F, the chart continues from one figure to the next with a connection being made from the same reference letter on one figure to the identical reference letter on the sequentially following figure. In FIG. 4, the block 21 initializes the system after a start command prior to the input information being introduced by the block 20. A block 22 determines the value of DF, the number of theoretical steps along a length per time interval needed to equal the commanded feed rate F and may be derived from the numerical values of 80 and 3 that are related to the number of motor steps to produce one inch of movement of the part 11 and the duration of a time interval. Though, of course, it will be understood that if the movement of the part produced by a motor step should differ, as in a metric system or by a mechanical connection between the motor and the part charged that the numerical values disclosed herein to determine the value of DF will also change. If a linear move is commanded (G=01), the determination exits on lead 23 to the linear determination method disclosed in my above-noted application, but if not, at the point 24, the value of DF is set. Its value is the same as that produced by the block 22 unless the radius of the arc is so small as to require a decreasing thereof in order to set a lesser maximum velocity that is within the system's ability to maintain accuracy. The method then proceeds to the end of FIG. 4 (at reference letter A) at which time the direction along each axis in the final approach to the end of the movement has been determined and stored as FXREV and FYREV.

From the arrow R in FIG. 4A, the remainder of the method is followed once for every length determined with the preceding steps only being effected once to initialize the system to the command information. At a point 25, a determination has been made of the X axis direction (NXREV) of the length being determined by considering the signs of i and j that have been up-dated by the effect thereon to the extent of the previous length. Similarly at a sequential point 26, the same determination has been made for the Y axis direction for the present length.

From the point 26 to the reference letter B at the bottom of FIG. 4A, the determination inquires if the direction for the present length is the same as the final direction for both axes and if so BLXV (BLYV) are both set to 1. While, if not the same, it is known that a change in direction on an axis will occur before completion of the movement and thus prevents a zero value of BLX (BLY) from being sensed as the end of a movement.

From the point B at the beginning of FIG. 4B to the point 27, the maximum and minimum extents of the present length on the X axis are determined. It will be noted that the AX state is used to set the NXXMAX value to 1 for the first two lengths following a length that has an X length of zero steps. This is achieved by the first length after a zero X axis length having NXXMAX set to one by way of blocks 28 and 29 directing the sequence to a block 30. For setting the next length to also have only one step on the X axis, a block 31 directs the sequence to a block 32, then to the block 29 and finally a block 33. In the latter block, NCX is equal to zero so that NXXMAX thus becomes equal to 1. This procedure thus assures that from a stop produced by a zero step length on an axis, the motor will receive two lengths of one step each so that at the end of the second length the motor has assuredly achieved the value of K speed. It should also be noted that if there is to be a change in direction, that a block 34 assures that one length will have a zero extent by setting NXXMAX to zero.

For other than the above lengths, the blocks between the point B and the point 27 consider three probable values along the X axis for the length being determined by the said length being limited in extent along the X axis within an absolute value of one from the X axis' previous length. However, the number of possible values may be less, as for example, that caused by a block 35 which sets a maximum value to a shorter length in view of deceleration being required.

From the point 27, through the reference letters C and D, the sequence flows to a point 36 on FIG. 4C wherein the same determinations are made for the minimum and maximum values of the extents of the present length on the Y axis. Normally with three probable X axes length extents and three probable Y axes length extents there would at most be nine probable extents. However, as sometimes some are excluded there may be a lesser number caused by the requirements for the acceleration and deceleration with an unexcluded probable extent being a possible extent for the present length.

From the point 36 to the point 37, the determination inquires if both movements have been complete and if so, indicates by a block 38 that the movement has been completed. The method is then ready for the next commanded movement. If not "done", the sequence flows to a block 39 which through the reference letter E at the bottom of FIG. 4C, sets the approximate relative weighted value to be given to each X and Y step for its contribution to the distance along the actual path in determining the present length. There are four possible relative weighted values with one being selected and used by a block 40 in FIG. 4D to determine the actual approximate length in theoretical steps for the minimum length (NXXMIN and NYXMIN), weighted by a value of 16. In this approximation the actual contribution is multiplied by sixteen which both provides for whole number processing and a relative base for use with the weighted path deviation produced by a step which deviation is multiplied by the value of W which in the present instance is 42 as herein described. Even though this determination is an approximation, the average velocity error introduced over the movement is less than a maximum of 2½% which, as it relates to velocity is within tolerable limits.

From the block 40 to a block 41, the system determines the approximate path deviation of the minimum length NXXMIN and NYXMIN by multiplying each X step by $\pm 2i$ and each Y step by $\pm 2j$. Though the actual path deviation is $\pm 2i \pm 1$ or $\pm 2j \pm 1$, the one is hereat presently neglected. This deviation is then used to alter the accrued deviation register EI and the output values of NXX and NYX are set to the values of a minimum length. The system then by a block 42 determines the weighted deviation for the minimum length with it being understood that the term 3W divided by 32 is used to accommodate the error of the minimum length deviation introduced by neglecting the $\pm 1$ in the prior steps from block 40 to block 41. Also the distance from the end of the minimum length to the commanded path along a radius is EI divided by 2R (neglecting again the unit 1 which is taken care of by the term 3W divided by 32).

At the block 42, the system has determined the weighted effect of the deviation for the minimum move and the weighted effect of the velocity also for the minimum move by block 40. From the block 42 to the block 43 the system determines the weighted value of the deviation to be given each X and each Y step, namely WEIX and WEIY, respectively.

At the block 43 the decision is made to emphasize velocity by way of a block 44 if a length has not yet achieved an extent which equals or exceeds the commanded velocity by the block 44 only having a value which exerts a minor influence on the weighted velocity portion of the weighted sum, WS. If the commanded velocity has been achieved, the weighted value of the accumulated velocity error including the minimum length is determined.

Accordingly, after the block 45 the effect of the minimum length on the accumulated path deviation register EI and accumulated velocity error register ED has been determined; the weighted value for deviation and velocity error for each X step and each Y step has been set; the weighted sum of the accumulated path deviation and accumulated velocity error including the minimum length has been determined and stored at WS; the accumulated velocity error produced including the minimum length is stored as ES and the coordinants of the minimum length are stored as NXS and NYS. The system now has a weighted sum for accumulated deviation and error and then begins to explore the remaining eight probable extents of the length to select the extent of that length which produces the lowest weighted sum. If no extent produces a lesser sum than that produced by the minimum length, the latter becomes the determined length. During the investigation of all possible extents, any extent which produces a lesser sum is immediately provisionally determined as the most acceptable length pending the investigation of the remaining extents. Thus, the determined length has that extent which renders it most acceptable by producing the smallest weighted sum.

Figure 3:
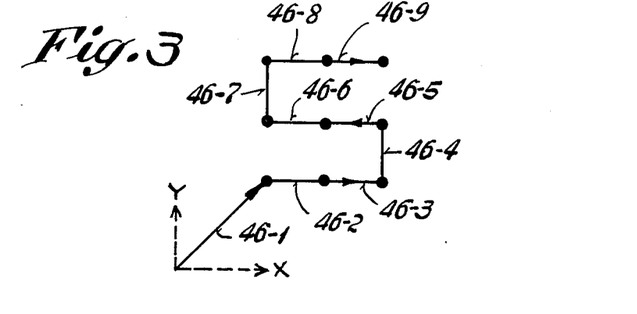
FIG. 3 is a pictorial diagram of a route in which possible lengths are investigated to determine the most acceptable length.

In FIG. 3 there is shown the manner in which the other eight probable extents are investigated with the extents being indicated by the reference characters 46-2 to 46-9 and the minimum move indicated by the character 46-1. The system initially investigates the two changes in the X axis extent with a Y axis minimum length, namely extents 46-2 and 46-3; then investigates the maximum to minimum X axis extents with the minimum value of the Y axis extent being increased by 1 (extents 46-4, 46-5 and 46-6) and then investigates the minimum to the maximum X axis extents with the value of the Y axis extent being at a maximum, namely 46-7, 46-8 and 46-9. All of the extents are investigated though some may be more immediately rejected as will be hereinafter appreciated than others. The weighted sum of each extent, if not immediately rejected is compared with the weighted sum produced by the provisionally selected extent and if any extent produces a weighted sum which is less than the sum WS, it becomes the provisionally selected extent and its values are stored as WS, NXSS, NYSS and ES so that at all times these values maintain the information of the extent which has been found most acceptable during the probable extent investigation. It will be noted that while there are nine probable extents, the determination of the maximum extents may exclude some of the extents.

Referring to the investigation, the above process to obtain the most acceptable extent proceeds from the block 45 to the remainder of FIG. 4D and through reference letters F and G to a block 47 in FIG. 4E. The investigation of extents 46-2 and 46-3 traverses a path that includes a line 48 with a return line 49; the extent 46-4 traverses a path through reference letter G and a line 50 with a return line 51 to a block 52; extents 46-5 and 46-6 traverse a path having a line 53 with a return to the block 52 either directly or by way of a block 54; the extent 46-7 traverses a path that includes a line 55 and a line 56 with a return being on a line 57 through the reference letter F to just after the block 45 and the extents 46-8 and 46-9 will again traverse the line 48. After the paths have been completed by both NXX and NYX being made equal to their maximum values then the sequence flows through reference letter G and a line 58 to the output block 47.

It will be understood that in the determination of each of the extents, considering for example the blocks between line 48 and return line 49 that there is initially determined individually the weighted deviation (WEI) and velocity error (ED) caused by the increase in the length of one step on the X axis. The value of just the weighted deviation is then subsequently compared by a block 59 with the value of W to determine if this one step increase would produce a length which deviates more than one step beyond the commanded path as a value of W equals a one step deviation. If so, no further processing of this extent is permitted. If, however, less than a one step deviation is produced, the extents weighted sum, WE, is determined and compared against the value of WS which is the best value of WE that has been obtained so far in considering the extents. If it is less than the previous value of WS then WS, NXS, NYS and ES are changed to the value of the present possible extent to thus maintain the storage of the extent which produces the smallest error during the investigation.

By using block 59 the time for the investigation is thus shortened as it quickly eliminates further steps in the investigation of an unacceptable probable extent. It will also be clear that in the determination of the deviation and velocity error for each extent, that such determination treats each extent as a complete length rather than just the effect which one step per se would produce.

At the block 47 the most acceptable length of the possible extents has been determined and its values are outputted as NXX and NYX together with their direction of movement to the motor control. Also the accumulated deviation error ED is up-dated by being made equal to the value of ES.

Upon the completion of the supplying of the information for the selected length to the motor control, the system then up-dates the various registers and bistable devices. Initially there is determined if the feed rate has been equaled or exceeded by the selected length in order to control the state of AD and if so either begin the accumulation of the velocity error if the selected length is the first such length or up-date the accumulated velocity error as by block 59'. In FIG. 4F, the accumulated path deviation is set to an accurate value by a block 60 causing the inclusion of the unit $\pm 1$ which enables the blocks through 61 to only be required to use i or j values and the relative change in the selected length over the minimum length.

The values of NCY and BNX are altered from block 61 to a block 62 to maintain information of the distance required for deceleration on the X axis and also similar registers for the Y axis are up-dated. As the final step in the process of determining a length, the $\Delta X$ and $\Delta Y$ registers have their counts altered by blocks 62 through block 63 to maintain a count of the distance on each axis that must be traversed to the end of the movement before the system returns to point R at the top of FIG. 4A to begin the processing of the next length upon the receipt of a new determination request from the motor control.

Figure 2:
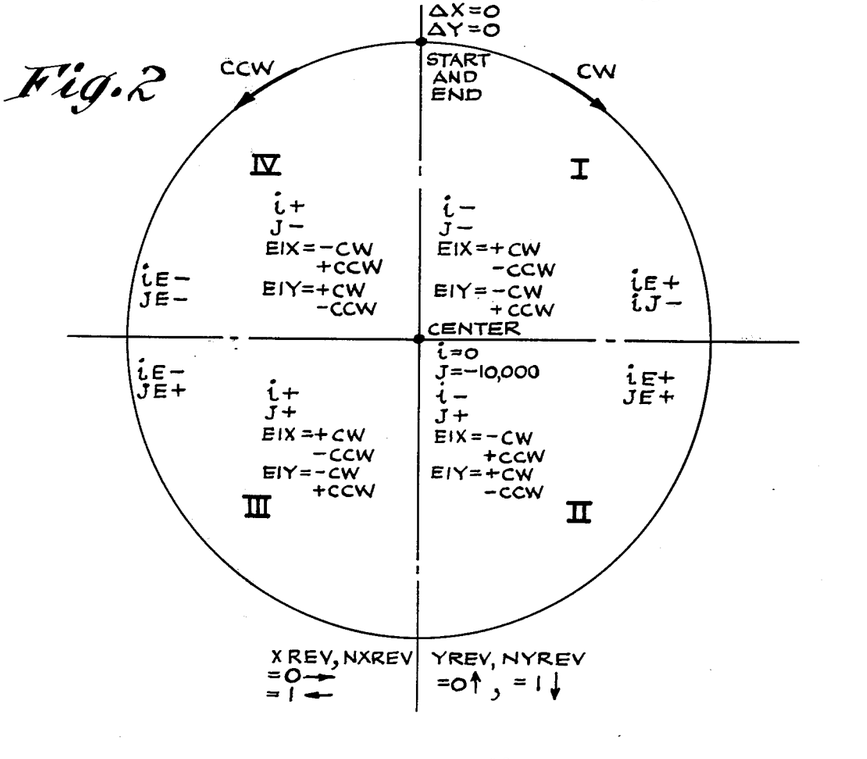
FIG. 2 depicts a commanded path for a circle which is shown divided into quadrants having information that exists in the method when the actual path is located in each of the quadrants.

Shown in FIG. 2 is a circle which would be produced by input commands of $\Delta X=0$, $\Delta Y=0$, $i=0$ and $j=-10,000$, $W=42$, $K=160$ and $F=90.0$ and thus is a complete circle having a radius of 10 inches. The numerical control system herein disclosed produces such a commanded circle in approximately 1,336 length determinations. The deviation of the actual movement from the commanded movement attributal to the present determination method was within 0.707 times a step length while the accumulated velocity error does not exceed the commanded velocity (90 inches per minute) by substantially more than one step. The motor speeds are such that the movement that equals the extent of each length is produced in 1 divided by 160 or 0.00625 seconds so that the total movement requires less than 10 secs.

The circle is shown subdivided into four quadrants denoted I, II, III and IV. From the start of the first quadrant, (which is also the start and end of the circle), the lengths sequentially increase in extent by one step on the X axis until a length of 49X and $-5Y$ is produced. Thereafter the number of X steps gradually decreases while the number of Y steps gradually increases until they are both equal for two lengths at 35 steps each, with one of these lengths having values of $i=7051$ and $j=7091$. The X number of steps further decreases and Y increases until at the end of the first quadrant at least one length has an X valve of zero and Y is equal to $-50$. The Y axis number of steps thereafter decreases in sequential lengths as the X number of steps increases with again there being at least one length of $X=-35$ and $Y=-35$ and a length of $X=-50$ and $Y=0$ at the end of the second quadrant. The remaining movement essentially mirrors the above with the final thirteen lengths or so merely being deceleration to zero along the X axis to the end position as the number of Y axis steps has been completed.

There is also shown in FIG. 2 the different binary states or algebraic conditions that occur in the quadrants during their determination for some of the herein used symbols.

The input data to the system on the line 12 is the actual path desired and may include tool compensation.

While the herein disclosed specific embodiment of the invention utilizes the smallest extent of the nine probable extents, it is contemplated that another of the extents may be used as the initial length from which the most acceptable length is determined. But in either event each length selected by the specific embodiment herein disclosed has an extent which is within an absolute value of one on each axis from the extent of its immediately preceding length.

Though the method disclosed herein provides for selecting the most acceptable length which maintains the actual deviation within less than one step, the time required for rendering a determination is only on the order of about one millisecond. As each length requires a time interval of 6.25 milliseconds (with $K=160$) to have its movement produced, if a computer is used to perform the determination, there is substantial time available for performing other calculations during a time interval.

As used herein, probable extents is any extent that is within an absolute value of 1 (or another value if desired) from the extent of the previous length on each axis while possible extents are those probable extents which are not excluded during the determining of the minimum and maximum extents. Also while the herein disclosed embodiment utilizes constant time intervals, varying time intervals and a different difference of extent between lengths may be used as disclosed in my copending application Ser. No. 433,844, filed Jan. 16, 1974, assigned to the assignee of the present invention and entitled "Digitally Determined Velocity Control Method and Means for a Digital Motor System".

It is contemplated that in order to decrease the overall computer time required for determining lengths, that some double-size lengths may be used for time intervals of double-duration, especially during portions of the movement at or about the commanded velocity. When double-lengths are employed, each double length on an axis will differ in extent from the previous axis extent by an absolute value of 1 or such other preselected constant which preferably would be the same constant as for differences in axis extent for single lengths.

While the length values are herein transferred directly to the motor control 15 in the form of electrical representations, it is within the scope of the present invention that the values of the lengths could be stored in storage means such as punched tape, binary memory, etc., in either the same form of representations supplied the motor control or else in a coded increment format which may only store the differences between lengths thereby generally permitting a reduction in the quantity of storage required.

It will accordingly be understood that there has been disclosed a method for producing actual arcuate movement by incremental movement or steps along two coordinate axes. Rather than make a determination for each step, the present method determines the extent in steps along each axis for successive lengths with each extent normally having a plurality of steps. Each selected length is normally chosen from a plurality of possible extents with the selection involving a consideration of the effect on path deviation and velocity error. The effect of each of the latter are weighted for emphasizing one to the other and the selected length has the least sum of the weighted deviation and error.

Variations and modifications may be made within the scope of the claims and portions of the improvements may be used without others.

I claim:

1. The method of producing actual relative movement along two coordinate axes with a minimum deviation from a commanded path comprising the steps of subdividing the movement into a plurality of successive lengths, normally providing a plurality of different possible extents for each length with the extent of each possible length being defined by a number of increments on each axis and with each possible length being no more than a set number of increments on each axis from the extents of the immediately prior length, selecting the extent which has the least deviation size, and producing a relative movement of the selected extent of the length with the movement for each length occurring over the same constant time interval for each length and in which the step of selecting includes the step of investigating the size of the deviation which would be produced by each possible length.

2. The invention as defined in claim 1 in which the step of investigating includes determining the size of the deviation produced by one possible extent and storing the deviation size thereof and in which the step of selecting further includes comparing the size of the deviation produced by each of the other possible extents with the stored deviation size and replacing the stored size with the deviation size of any possible extent that is found to be smaller than the size being stored.

3. The invention as defined in claim 2 in which the step of determining the size of the deviation produced by the one possible extent includes maintaining the size of the deviation produced by the immediately prior length and algebraically adding thereto the size of the deviation produced by the difference in extent between the prior length and the one possible extent.

4. The invention as defined in claim 1 in which the set number of increments of the possible extents is an absolute value of one on each axis and in which the step of investigating includes determining at least the approximate size of the deviation produced by an increment on each axis and algebraically adding such increment deviation size to the size of the deviation produced by another possible extent to obtain the size of the possible extent being presently investigated.

5. The method of producing actual relative movement along two coordinate axes within an acceptable deviation and velocity error of a commanded path having a commanded velocity comprising the steps of subdividing the movement into a plurality of successive lengths, normally providing a plurality of different possible extents for each length with the extent of each possible length being defined by a number of increments on each axis and with each possible length being no more than a set number of increments on each axis from the extents of the immediately prior length, selecting the possible extent which would produce a movement that both minimizes the deviation from the commanded path and minimizes the error in velocity from the commanded velocity and producing a relative movement of the selected extent of the length with the movement for each length occurring over the same constant time interval for each length.

6. The invention as defined in claim 5 in which the step of selecting includes the step of investigating the size of the deviation and the amount of the velocity error for each possible length and providing a total value that is related to both the size of the deviation and the amount of the error and in which the step of selecting picks the possible extent having the least total value.

7. The invention as defined in claim 6 in which the step of providing a value includes adding the size of the deviation times a merit figure and the amount of the velocity error times another merit figure.

8. The invention as defined in claim 7 in which the merit figures are numbers and in which the ratio therebetween sets the relative emphasis between path deviation and velocity error.

9. The invention as defined in claim 8 in which the step of normally providing a plurality of possible extents includes defining each extent by a number of increments on each axis and in which the step of investigating has the size of the deviation and the amount of the error velocity commonly measured in increments.

10. The invention as defined in claim 9 in which the step of normally providing includes initially providing the size of the deviation independently from the amount of the error and in which there is the step of ceasing further investigating of a possible extent which produces a size of deviation greater than one increment.

11. The invention as defined in claim 6 in which the step of providing the possible extents defines each extent by a number of increments on each axis, finding an approximate incremental value of the velocity error produced by an increase of one increment on each axis and utilizing said approximate value to determine the amount of the error.

12. The invention as defined in claim 11 in which the step of investigating includes determining the value for the error for one possible extent by the summing of the results of the value produced by the number of increments on each axis times each axis' approximate incremental value.

13. The invention as defined in claim 12 in which the number of increments on each axis of the possible extents are within an absolute value of 1 and in which the step of investigating includes algebraically adding the approximate incremental value to the value found for the one possible extent to obtain the value of error for another possible extent for each increment difference therebetween.

14. The invention as defined in claim 5 in which the step of minimizing the error in velocity normally includes considering the error in velocity produced by the immediately prior length.

15. The invention as defined in claim 14 in which the step of considering includes maintaining the value of the error in velocity produced by the immediately prior length, and algebraically adding said value to the value of error produced by the possible extents.

16. The invention as defined in claim 14 in which the step of considering is prevented until a length has achieved at least the commanded velocity.

17. The method of producing actual relative movement along two coordinate axes within an acceptable deviation from a commanded arcuate path comprising the steps of subdividing the arcuate movement into a plurality of successive linear lengths, selecting the direction and extent of each length to that which would produce a movement which would be within the acceptable deviation and which also has a relationship with its immediately prior length and producing a relative movement for the extent of each length and in which each length is defined as a number of increments of movement on each axis to be produced simultaneously during a time interval and in which the step of selecting causes the relationship between successive lengths to have an extent that has the number of increments on each axis to be within an absolute numerical value of each other.

18. The invention as defined in claim 17 in which there is a commanded feed rate setting the desired maximum velocity of movement along the path and in which the step of selecting includes determining the radius of the arc and setting a lower value of maximum velocity for any radii less than a preselected size.

19. The invention as defined in claim 18 in which there is the step of determining the maximum velocity as a theoretical number of increments of movement along each length and in which the preselected size of the radii is made essentially equal to one half the square root of the radius.

20. The invention as defined in claim 17 in which the step of selecting includes determining the direction along each axis of the center of the arc from the beginning of each length and utilizing same to set the direction on each axis for each length.

21. The invention as defined in claim 17 in which the commanded arcuate path is greater than ninety degrees to cause the direction of the successive lengths on at least one axis to be reversed and in which the step of selecting selects one length to have a zero extent along the one axis before selecting a different direction for a subsequent length.

22. The invention as defined in claim 21 in which each length is defined by a number of increments of movement on each axis and in which the step of selecting causes the extent of a length following a length having a zero extent on an axis to have only a predetermined number of increments on the one axis.

23. The invention as defined in claim 22 in which the step of selecting causes the next length after a following length to repeat the same number of increments on the one axis as that in the following length.

24. The invention as defined in claim 17 in which the commanded arcuate path is greater than ninety degrees to cause the direction of the lengths at least on one axis to be reversed and in which the step of selecting includes determining the final direction on the one axis to the end of the commanded path, maintaining an algebraic indication of the total extent of the lengths on the one axis and terminating further movement on the one axis when both the algebraic indication is that the movement has been completed and the direction of the length producing the completed zero indication coincides with the final direction.

25. An apparatus for producing actual relative movement along two coordinate axes within a minimum deviation from a commanded path comprising motor means connected to each axis for producing a determined extent of movement with the determined extents for each axis being essentially simultaneously produced, means for receiving information of the commanded path, means for subdividing the commanded path into a plurality of actual successive lengths with the lengths constituting the actual movement, means for normally selecting a plurality of different possible lengths for each length with each possible length having an extent on each axis which is within an absolute numerical value from the extents of the immediately prior length, means for determining the one possible length which produces the least deviation from the commanded path, and means for directing the determined length as a determined extent on each axis to its respective axis motor means to produce the actual length with the movement for each length occurring over the same constant time interval for each length.

26. An apparatus for providing actual relative movement along two coordinate axes within an acceptable deviation and velocity error from a commanded path and velocity comprising motor means connected to each axis for producing a determined extent of movement with the determined extent for the axes being essentially simultaneously produced, means for receiving information of the commanded path and velocity, means for subdividing the commanded path into a plurality of actual successive lengths with the lengths constituting the actual movement, means for normally selecting a plurality of different possible lengths for each length with each possible length having an extent on each axis which is within an absolute numerical value from the extents of the immediately prior length, means for determining the one possible length which produces the least combination of path deviation and velocity error from the commanded path and velocity and means for directing the determined length as a determined extent on each axis to its respective axis motor means to produce the actual length with the movement for each length occurring over the same constant time interval for each length.

27. An apparatus for providing actual relative movement along two coordinate axes within an acceptable deviation from a commanded arcuate path comprising motor means connected to each axis for translating each pulse received essentially simultaneously into an increment of movement in accordance with a direction signal, means for receiving information of the commanded arcuate path, means for subdividing the commanded path into a plurality of successive lengths with the lengths constituting the actual movement, means for normally selecting a plurality of different possible extents for each length with the extent of each possible length being defined by a number of increments on each axis and with each possible length being no more than a set number of increments on each axis from the extents of the immediately prior length, means for determining one possible extent which produces an acceptable deviation from the commanded path, means for determining for each extent the deviation of the extent along each axis, means for producing the determined extent as a length defined by a number of pulses and a direction signal to their associated motor means to produce the actual length with the movement for each length occurring over the same constant time interval for each length.

28. The invention as defined in claim 27 in which the arcuate path has a center and in which the means for determining the direction includes means for finding the relative direction along each axis between the beginning of each length and the center.

29. The invention as defined in claim 28 in which the means for finding includes a register for each axis that indicates the distance and direction of the center along each axis and in which there are means for changing the indication of each register by the algebraic addition thereto of the extent along each axis of the extent of the previously determined length.

* * * * *